3,392,166
ANDROST-4-ENES AND ESTR-4-ENES HAVING A 17α-DIETHYLENICALLY UNSATURATED SIDE CHAIN
John A. Edwards, Los Altos, Calif., and Lawrence H. Knox, deceased, late of Mexico City, Mexico, by Anne A. Knox, Mexico City, Mexico, assignors to Syntex Corporation, Panama, Panama, a corporation of Panama
No Drawing. Continuation-in-part of application Ser. No. 514,139, Dec. 15, 1965. This application Mar. 30, 1966, Ser. No. 539,260
27 Claims. (Cl. 260—239.55)

This application is a continuation-in-part of United States application Ser. No. 514,139, filed Dec. 15, 1965, now abandoned.

This invention relates to novel cyclopentanophenanthrene derivatives having a 17α-diethylenically unsaturated side chain.

More particularly, the present invention relates to novel compounds of the following formulae:

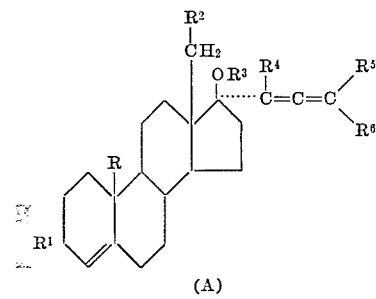

(A)

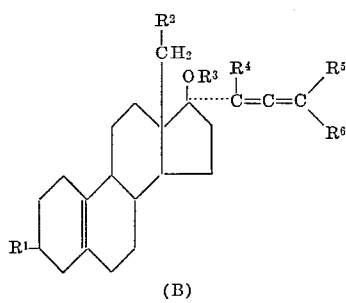

(B)

wherein R is hydrogen or methyl, $R^1$ is oxo or the group

wherein $R^7$ is hydrogen, hydroxy, tetrahydropyran-2-yloxy, tetrahydrofuran-2-yloxy, or a carboxylic acyloxy group containing less than 12 carbon atoms, $R^2$ is hydrogen or a lower alkyl containing from 1 to 3 carbon atoms such as methyl, ethyl, or propyl, $R^3$ is hydrogen, tetrahydropyran-2-yl, tetrahydrofuran-2-yl, or a carboxylic acyl group containing less than 12 carbon atoms, and each of $R^4$, $R^5$ and $R^6$ is hydrogen or methyl.

The carboxylic acyl and acyloxy groups of the compounds of the present invention contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, dichloroacetate and the like.

The novel steroids provided by this invention demonstrate progestational and pituitary inhibition activity and are useful in the treatment of various menstrual disorders and in the control and regulation of fertility. They may be administered in the usual pharmaceutical compositions at dosages appropriate for the condition being treated.

The compounds of the present invention are prepared according to a process which may be illustrated as follows:

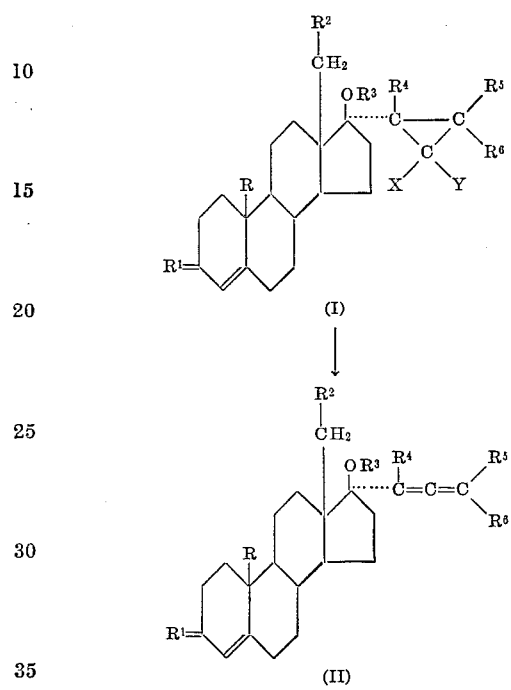

wherein R, $R^1$, $R^2$, $R^3$, $R^4$, $R^5$ and $R^6$ are as previously defined and X and Y are bromo, chloro or fluoro. In practicing the above illustrated process, the 17α-dihalocyclopropyl-Δ⁴ steroid I is treated with magnesium in an inert reaction medium such as diethyl ether, tetrahydrofuran, dioxane, or the like to furnish the 17α-diene steroid II. The reaction may be conducted at room temperature or above for a period of time of the order of two to twenty-four hours or more, preferably at reflux temperature for about two hours.

The foregoing illustrated process may also be used to prepare the novel $Δ^{5(10)}$-17α-dienes of Formula B by using the corresponding $Δ^{5(10)}$-17α-dihalocyclopropyl compound as the starting material in lieu of the Δ⁴-17α-dihalocyclopropyl compound (I) illustrated and described above.

The compounds of the present invention of Formula A and B may also be prepared by treating a Δ⁴- or $Δ^{5(10)}$-17α-dihalocyclopropyl compound, respectively, with a molar excess, preferably about 3 to 10 molar equivalents, of potassium t-butoxide or sodium methylsulfinylcarbanion in an inert organic solvent medium such as dimethyl sulfoxide, diethyl ether, tetrahydrofuran, dioxane, and the like at room temperature or above for a period of time of the order of three to twenty-four hours or more.

Another method for the preparation of the compounds of the present invention is to treat a Δ⁴- or $Δ^{5(10)}$-17α-dihalocyclopropyl compound with a molar excess, preferably about 2 to 10 molar equivalents, of butyl lithium in an inert reaction medium such as dioxane, tetrahydrofuran, hexane, and the like, at a temperature of from about −40° C. to 0° C. for a period of time of the order of one to twenty-four hours or more, preferably at about −35° C. for about one hour.

In practicing the foregoing processes, the substituents of the steroid nucleus in positions 3 and 17 are preferably a hydroxy group, an ether group or an ester group. In the case of the preparation of the novel $\Delta^4$ compounds of Formula A, the 3-keto-$\Delta^4$ starting material may be converted into the ketal or enol ether prior to the conversion of the 17α-dihalocyclopropyl group into the 17α-propadienyl group and thereafter by treatment with acid, the ketal or enol ether is converted into the 3-keto-$\Delta^4$ derivative. The substituent in position 3 of the $\Delta^4$ and $\Delta^{5(10)}$ steroid nucleus may also be an ester, e.g. an acetate, benzoate, etc. or an ether, e.g. tetrahydropyran-2-yl ether or tetrahydrofuran-2-yl ether, which are preferably formed prior to converting the 17α-dihalocyclopropyl group into the 17α-propadienyl group. Similarly, the substituent in position 17 of the $\Delta^4$ and $\Delta^{5(10)}$ steroid starting material may be a hydroxy group, an esterified group, e.g. acetoxy, benzoyloxy, etc., or an etherified group, e.g. tetrahydropyran-2-yloxy or tetrahydrofuran-2-yloxy, preferably an esterified or etherified group prior to preparation of the compounds of the present invention.

The compounds of the present invention of Formula A and B wherein $R^1$ is the group $$R^7-\overset{H}{\underset{|}{C}}$$

and $R^7$ is hydrogen, or in other words, the 3-desoxy derivatives, may be prepared from the corresponding 3-desoxy-17α-dihalocyclopropyl compound by use of one of the aforementioned processes. Alternatively, the 3-keto derivatives of Formula A and B may be converted to the corresponding 3-desoxy derivative by thioketalization followed by desulfurization with Raney nickel.

The compounds of the present invention according to Formula A wherein R is hydrogen, or in other words, the 19-nor-$\Delta^4$-17α-dienes may also be prepared by treating the $\Delta^{5(10)}$-17α-dienes of Formula B with a weak acid or base to shift the double bond from position 5(10) to postion 4.

The 17α-dihalocyclopropyl starting materials for the preparation of the compounds of the present invention are prepared from the corresponding 17α-alkenyl compound according to a process which may be illustrated as follows. For the sake of simplicity only, preparation of the $\Delta^4$-17α-dihalocyclopropyl starting material (IV) is shown in the following illustration; the process is also applicable for the conversion of $\Delta^{5(10)}$-17α-alkenyl compounds into the corresponding $\Delta^{5(10)}$-17α-dihalocyclopropyl derivatives.

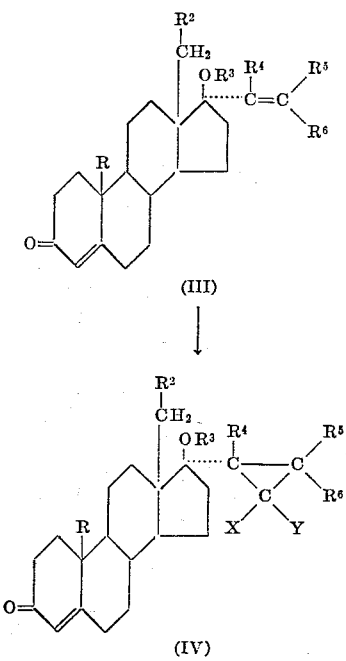

In the above formulas, R, $R^2$, $R^3$, $R^4$, $R^5$, $R^6$, X and Y are as previously defined hereinabove.

In the practice of the foregoing transformation, a steroid having a vinyl or a methyl substituted vinyl group, e.g. 1-propenyl, isopropenyl, or 3-methyl-2-butenyl, in the 17α-position (III) is treated with a dihalocarbene generated, for example, from alkali metal salts of haloacetic acid, e.g. sodium trichloroacetate, sodium chlorodifluoroacetate, sodium dichlorofluoroacetate, and sodium tribromoacetate, to yield the corresponding 17α-dihalocyclopropyl derivatives (IV). The reaction is executed under anhydrous conditions in an inert organic solvent such as diethylene glycol dimethyl ether, triethylene glycol dimethyl ether, or the like. The product forms directly and may be readily separated from the reaction mixture by conventional methods. Likewise, other reagents known to generate dihalocarbenes, such as trimethyl(trifluoromethyl)tin, phenyl(trichloromethyl)mercury, phenyl(bromodichloromethyl)merucry, and the like, with sodium iodide, may also be used in a similar fashion. The 17α-dibromocyclopropyl derivatives may also be obtained through the action of bromoform and potassium t-butoxide on a 17α-alkenyl compound of Formula III.

The requisite 17α-alkenyl-$\Delta^4$ and $\Delta^{5(10)}$ starting material is readily prepared from the corresponding 17-keto compounds through conventional methods, e.g. treatment with an alkenyl magnesium halide. Alternatively, the 17α-alkenyl starting materials may be prepared from a 17α-alkynyl compound through controlled hydrogenation according to conventional procedures.

The resulting 17β-hydroxy-17α-alkenyl compounds may be converted to the corresponding 17β-acyloxy, 17β-tetrahydropyran-2-yloxy, or 17β-tetrahydrofuran-2-yloxy derivatives via conventional methods as through the use of an acid anhydride and p-toluenesulfonic acid in acid, or through the use of dihydropyran or dihydrofuran and an acid catalyst, respectively, prior to preparation of the 17α-dihalocyclopropyl starting materials or may be esterified or etherified thereafter, preferably prior to the formation of the 17α-dihalocyclopropyl compound.

The 3-keto group of the 17α-dihalocyclopropyl starting material may be reduced with sodium borohydride, lithium aluminum tri(t-butoxy)hydride, or the like to obtain the corresponding 3β-hydroxy compound. The resulting 3β-hydroxy group may then be etherified by treatment with dihydropyran or dihydrofuran and an acid catalyst or esterified by treatment with an appropriate carboxylic acid anhydride, such as acetic anhydride, in pyridine, and the like.

The 3-keto group of the 17α-dihalocyclopropyl starting material for preparation of the compounds of the present invention may also be converted to the 3-thioketal by treatment with e.g. ethanedithiol, 1,2-propanedithiol, or 1,3-propanedithiol and then desulfurized with Raney nickel to obtain the 3-desoxy derivatives thereof.

The following detailed examples are presented to illustrate the present invention, but not as a limitation thereof.

PREPARATION A

A mixture of 28 g. of 3β,20β-dihydroxypregn-5-en-18-oic acid, 18,20-lactone-3-acetate and 700 ml. of toluene is heated under reflux with 3 N-methylmagnesium chloride in 400 ml. of tetrahydrofuran for 4 days. The reaction mixture is cooled, poured onto ice, diluted with water and extracted with ethyl acetate. The organic layer is washed with water, dried and evaporated to yield 3β,20β-dihydroxy-18-methylpregn-5-en-18-one which may be crystallized from acetone:hexane.

A solution of 12.2 g. of 3β,20β-dihydroxy-18-methylpregn-5-en-18-one in 400 ml. of triethylene glycol is heated under reflux at 145° C. with 80 ml. of 80% hydrazine hydrate and 25 g. of hydrazine dihydrochloride for 5 hours. The mixture is then allowed to cool and thereafter poured into water. The mixture is then extracted with ethyl acetate and the organic layer washed with water, dried and evaporated to dryness to yield the corresponding 18-hydrazone derivative which may be crystallized from ethyl acetate:hexane.

A solution of 20 ml. of hydrazine hydrate in 200 ml. of diethylene glycol is distilled, under nitrogen, until the internal temperature reaches 225° C. Ten grams of potassium hydroxide is then added cautiously and distillation continued, under nitrogen, until the temperature again reaches 225° C. A solution of 15 g. of the above-prepared 18-hydrazone in 150 ml. of diethylene glycol is then added slowly while maintaining the temperature of the reaction mixture at reflux at 225° C. The resulting solution is heated under reflux in a nitrogen atmosphere for 5 hr., cooled, diluted with water and the precipitate which forms collected by filtration, washed with water and dried under vacuum to yield 18-methylpregn-5-ene-3β,20β-diol which may be crystallized from methanol.

A solution of 2.2 g. of 18-methylpregn-5-ene-3β,20β-diol in 50 ml. of toluene and 8 ml. of cyclohexanone is boiled until 10 ml. of distillate is collected. Three milliliters of cyclohexanone and 2 g. of aluminum isopropoxide are then added and the mixture heated at reflux for 15 min., cooled, and poured into 150 ml. of water containing 5 ml. of acetic acid. The mixture is steam-distilled to remove solvents and the resulting emulsion extracted 3 times with 150 ml. portions of ether. The organic layer is washed with water, 2 N-hydrochloric acid and saturated sodium bicarbonate solution, dried and evaporated. The residue is dissolved in hexane:benzene (2:1) and absorbed on alumina. Elution with benzene yields 18-methylprogesterone.

A mixture of 1 g. of 18-methylprogesterone, 10 ml. of dioxane, 1 ml. of ethyl orthoformate, and 50 mg. of p-toluene-sulfonic acid in the presence of Drierite, at 25° C., is stirred for 2.5 hours. The mixture is poured into aqueous potassium bicarbonate and extracted with ether. The ether extract is dried over sodium sulfate and evaporated in the presence of a trace of pyridine. The resulting residue is dissolved in hexane:benzene (4:1) and filtered through alumina furnishing 3-ethoxy-18-methylpregna-3,5-dien-20-one which may be crystallized from methanol containing a trace of pyridine.

A solution of 500 mg. of the thus-prepared enol-ether in 5 ml. of tetrahydrofuran is added to 15 ml. of 1 N-potassium t-butoxide in t-butanol and the resulting solution shaken at 0° C. under an atmosphere of oxygen. The uptake of oxygen ceases at 35 ml. after 15 minutes. The solution is then neutralized to pH-7 by 1 N-acetic acid, extracted with ethyl acetate and the organic layer washed with water, dried and evaporated to dryness at 30° C. The residue is crystallized from acetone:water to yield 17α - hydroperoxy - 3 - ethoxy-18-methylpregna-3,5-dien-20-one.

A mixture of 3.1 g. of the thus-obtained 17α-hydroperoxide in 100 ml. of acetic acid is stirred with 6 g. of zinc dust at 25° C. for 12 hours. The mixture is then filtered and the residue washed with ether. The filtrate is diluted with ether and the organic layer washed with water and sodium bicarbonate solution, dried and evaporated to dryness. Purification of the residue by means of preparative thin layer chromatography on H.F. silica gel with chloroform:methanol (9:1) affords 17α-hydroxy-18-methylprogesterone which may be crystallized from acetone:hexane.

By using ethylmagnesium chloride or n-propylmagnesium chloride in place of methylmagnesium chloride, and repeating the procedure of this example, the corresponding 18-ethyl and 18-n-propyl derivatives, i.e. 17α-hydroxy - 18 - ethylprogesterone and 17α-hydroxy-18-n-propylprogesterone, respectively, are obtained.

A solution of 4.0 g. of 17α-hydroxy-18-methylprogesterone in 200 ml. of dry tetrahydrofuran is stirred with 20 g. of lithium tri-t-butoxyaluminum hydride at 0° C. for 7 hours and then at 25° C. for 15 hours. Water is added and the mixture concentrated to a small volume under vacuum. The residue is extracted with ethyl acetate and the organic layer washed with water and saturated sodium bicarbonate solution, dried and evaporated to dryness. This product in 200 ml. of acetatic acid is reacted with 12 g. of lead tetra-acetate at 25° C. with stirring for 1.3 hours. About 20 ml. of ethylene glycol is then added to destroy the excess of oxidant and the resulting solution diluted with water and extracted with ethyl acetate. The organic layer is then washed with water and saturated sodium bicarbonate solution, dried and evaporated to dryness. The resulting residue is dissolved in hexane:benzene (1:1) adsorbed on alumina and eluted with benzene:ether (19:1) to yield 3β-hydroxy-18-methylandrost-4-en-17-one which may be crystallized from acetone:hexane.

By use of the foregoing procedure employing 17α-hydroxy - 18 - ethylprogesterone and 17α-hydroxy-18-n-propylprogesterone as the starting material, there is obtained 3β-hydroxy-18-ethylandrost - 4 - en - 17 - one and 3β-hydroxy-18-n-propylandrost-4-en-17-one, respectively.

PREPARATION B

One gram of lithium tri-to-butoxyaluminum hydride is added to an ice-cooled solution of 1 g. of 17β-hydroxy-18-methylestr-4-en-3-one in 120 ml. of tetrahydrofuran and the mixture is then allowed to stand for 16 hours at room temperature. The excess reagent is decomposed by addition of water and the solution is then concentrated to small volume in vacuo and diluted with water. The product is extracted with ethyl acetate and these extracts are washed with water, dried and evaporated to yield 18-methylestr-4-ene-3β,17β-diol which may be further purified by recrystallization from acetone:hexane.

A mixture of 1 g. of 18-methylestr-4-ene-3β,17β-diol, 4 ml. of pyridine and 1.1 molar equivalents of acetic anhydride is allowed to stand at room temperature for 15 hours. The mixture is then poured into ice water and the solid which forms is collected by filtration, washed with water and dried to yield 3β-acetoxy-18-methylestr-4-en-17β-ol.

To a stirred solution of 1 g. of the above 17β-hydroxy compound in 10 ml. of acetone, cooled to 0° C., is added under nitrogen a solution of 8 N chromic acid until the color of the reagent persists in the mixture. The mixture is then stirred for 5 minutes at 0–5° C. and diluted with water. The solid which forms is collected by filtration, washed with water and dried under vacuum to yield 3β-acetoxy-18-methylestr-4-en-17-one which may be purified by recrystallization from acetone:hexane.

A suspension of 1 g. of the above 3β-acetoxy compound in 50 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield 3β-hydroxy-18-methylestr-4-en-17-one which is crystallized from acetone:hexane.

By repeating the foregoing procedure and using either 17β-hydroxy-18-ethylestr-4-en-3-one or 17β-hydroxy-18-n-propylestr-4-en-3-one in place of 17β-hydroxy-18-methylestr-4-en-3-one, there is obtained 3β-hydroxy-18-ethylestr-4-en-17-one and 3β-hydroxy-18-n-propylestr-4-en-17-one, respectively.

A mixture of 1 g. of 17β-hydroxy-18-methylestr-5(10)-en-3-one, 1 g. of p-toluenesulfonic acid monohydrate, 50 ml. of acetic acid, and 25 ml. of acetic anhydride is allowed to stand at room temperature for 24 hours, and then poured into water and stirred. This mixture is then extracted with methylene chloride and these extracts are dried and evaporated to yield 17β-acetoxy-18-methylestr-5(10)-en-3-one which is recrystallized from acetone:ether.

A solution of 1 g. of sodium borohydride in 3 ml. of water is added to a solution of 1 g. of 17β-acetoxy-18-methylestr-5(10)-en-3-one in 120 ml. of methanol at 0° C. and the mixture then allowed to stand for 15 minutes. The excess reagent is decomposed by the addition of acetic acid and the solution is then concentrated to small volume in vacuo and diluted with water. The product is extracted with ethyl acetate and these extracts are washed with water, dried and evaporated to yield 17β-acetoxy-18-methylestr-5(10)-en-3β-ol which may be purified by recrystallization from acetone:hexane.

Two milliliters of dihydropyran are added to a solution of 1 g. of the above 3β-hydroxy compound in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β-(tetrahydropyran-2′-yloxy)-17β-acetoxy - 18 - methylestr - 5(10)-ene which may be recrystallized from pentane.

A suspension of 1 g. of the above 3-ether-17β-acetate in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield 3β-(tetrahydropyran-2′-yloxy)-18-methylestr-5(10)-en-17β-ol.

A solution of 6 g. of the above 17β-hydroxyl compound in 120 ml. of pyridine is added to a mixture of chromic trioxide in 20 ml. of pyridine. The reaction mixture is allowed to stand at room temperature for 15 hours. Then 10 ml. of 1% sulfuric acid is added and the mixture allowed to stand for about 10 minutes. The reaction mixture is then diluted with ethyl acetate and filtered through Celite diatomaceous earth. The filtrate is washed well with water, dried and evaporated to dryness to yield 3β-hydroxy-18-methylestr-5(10)-en-17-one which may be purified by recrystallization from acetone:hexane.

By repeating the foregoing procedure using 17β-hydroxy-18-ethylestr-5(10)-en-3-one or 17β-hydroxy-18-n-propylestr-5(10)-en-3-one in lieu of 17β-hydroxy-18-methylestr-5(10)-en-3-one, there is obtained 3β-hydroxy-18-ethylestr-5(10)-en-17-one and 3β-hydroxy-18-n-propylestr-5(10)-en-17-one, respectively.

PREPARATION C

A solution of 5 g. of 3β-hydroxy-18-methylestr-4-en-17-one in 250 ml. of thiophene-free benzene is treated with 10 molar equivalents of isopropenylmagnesium bromide in anhydrous ether. The mixture is heated at reflux under anhydrous conditions for 24 hours, cooled, and cautiously treated with ethyl acetate and these extracts are in turn washed with water, dried over sodium sulfate and evaporated to dryness to yield 17α-isopropenyl-18-methylestr-4-ene-3β,17β-diol which may be recrystallized from methylene chloride:hexane.

By use of the foregoing procedure, using the starting material 3β-hydroxyestr-5(10)-en-17-one, 3-desoxy-18-methylestr-4-en-17-one, 3β - hydroxyandrost-4-en-17-one, 3β-hydroxy-18-n-propylandrost-4-en-17-one, 3β - hydroxy-18-methylandrost - 4-en-17 - one, 3β-hydroxy - 18 - ethylandrost - 4-en-17-one, 3-desoxy - 18-ethylestr-4-en-17-one, 3β - hydroxyestr - 4 - en - 17 - one, 3β - hydroxy - 18-methylestr - 5(10) - en - 17 - one, 3β - hydroxy - 18-ethylestr - 5(10) - en - 17 - one, 3β-hydroxy-18-n-propylestr-4-en-17-one, 3β-hydroxy-18-ethylestr-4-en-17-one or 3β - hydroxy - 18 - n - propylestr-5(10)-en-17-one in place of 3β-hydroxy-18-methylestr-4-en-17-one, the corresponding 17α-isopenyl-17β-hydroxy derivatives are obtained.

Likewise, through the use of vinylmagnesium bromide, 1-propenylmagnesium bromide, 3-methyl-2-butenylmagnesium bromide, or 1-methyl-1-propenylmagnesium bromide in lieu of isopropenylmagnesium bromide in the foregoing process, the aforementioned 17-keto compounds are converted to the corresponding 17α-alkenyl derivative, e.g. 17α-vinyl-18-methylestr-4-ene-3β,17β-diol, 17α-(1′-propenyl)-18-methylestr - 4 - ene - 3β,17β - diol, 17α-(3′-methyl - 2′ - butenyl) - 18 - methylestr-4-ene-3β,17β-diol, 17α-(1′-methyl-1′-propenyl) - 18-methylestr-4-ene-3β,17β-diol, etc.

The Grignard reagents employed in the foregoing procedure are prepared via conventionl procedures from magnesium and the appropriate olefinic halide. Thus, one method of preparing the Grignard reagents is as follows.

To a mixture of 8.0 g. of magnesium shavings and 100 ml. of dry ether cooled in an ice-bath, there is added, with stirring, 24 g. of 2-bromo-3-methyl-2-butene in 40 ml. of dry ether in a dropwise manner. After addition is complete, the mixture is refluxed for one hour to furnish 3-methyl-2-butenylmagnesium bromide.

In a similar fashion, by use of the appropriate olefinic bromide, i.e., vinyl bromide, 2-bromopropene, 1-bromopropene and 2-bromo-2-butene, in the foregoing process, there is obtained binylmagnesium bromide, isopropenylmagnesium bromide, 1-propenylmagnesium bromide, and 1-methyl-1-propenylmagnesium bromide.

A mixture of 1 g. of 17α-isopropenyl-18-methylestr-4-ene - 3β,17β - diol in 20 ml. of dioxane, and 1.1 molar equivalents of 2,3 - dichloro - 5,6 - dicyano - 1,4 - benzoquinone was stirred at 25° C. for 5.5 hours. The reaction mixture is filtered and the filtrate evaporated to dryness. The residue is dissolved in methylene chloride and filtered through 20 g. of alumina to yield 17α-isopropenyl-17β - hydroxy - 18 - methylestr - 4 - en - 3 - one which may be further purified by recrystallization from acetone: hexane.

By repeating the foregoing procedure using other 17α-alkenyl-3β,17β-diol compounds as the starting material in lieu 17α - isopropenyl - 18 - methylestr - 4 - ene - 3β, 17β-diol, the corresponding 17α-alkenyl-17β-hydroxy-3 - one derivatives, e.g. - 17α - vinyl - 17β - hydroxy-18 - methylestr - 5(10) - en - 3 - one, 17α - (1′ - propenyl) - 17β - hydroxy - 18 - methylestr - 5(10) - en - 3-one, 17α - (3′ - methyl - 2′ - butenyl) - 17β - hydroxy-18 - methylestr - 5(10) - en - 3 - one, 17α - (1′ - methyl-1′ - propenyl) - 17β - hydroxy - 18 - methylestr - 5(10)-en - 3 - one, 17α - isopropenyl - 17β - hydroxyestr-5(10) - en - 3 - one, 17α - (1′ - propenyl) - 17β - hydroxy - 18 - methylestr - 4 - en - 3 - one, 17α - isopropenyl - 17β - hydroxyandrost - 4 - en - 3 - one, 17α - (3′-methyl - 2′ - butenyl) - 17β - hydroxyestr - 4 - en - 3 - one, 17α - isopropenyl - 18 - methyl - 17β - hydroxyestr-5(10) - en - 3 - one, 17α - (1′ - propenyl) - 17β - hydroxy - 18 - methylandrost - 4 - en - 3 - one, 17α - vinyl-17β - hydroxy - 18 - methylandrost - 4 - en - 3 - one, 17α-(1′-propenyl)-17β-hydroxyestr-4-en-3-one, etc. are obtained.

PREPARATION D

A solution of 1 g. of 17α-ethynyl-17β-hydroxyestr-4-en-3-one in 40 ml. of pyridine is hydrogenated at 25° C. atmospheric pressure in the presence of 0.4 g. of prehydrogenated 2% palladium-on-calcium carbonate. When 1.1 molar equivalents of hydrogen are absorbed, the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution then washed with dilute hydrochloric acid and water to neutrality, dried and evaporated to dryness to yield 17α-vinyl-17β-hydroxyestr-4-en-3-one which is further purified through recrystallization from acetone.

By use of the process of this example, 17α-propynyl-17β - hydroxy - 18 - methylestr - 5(10) - en - 3 - one, 17α - propynyl - 17β - hydroxy - 18 - ethylestr - 5(10)-en - 3 - one, 17α - ethynyl - 17β - hydroxy - 18 - n - propylestr - 5(10) - en - 3 - one, 17α - ethynyl - 17β -hydroxy - 18 - n - propylestr - 4 - en - 3 - one, 17α - propynl-17β - hydroxy - 18 - ethylestr - 4 - en - 3 - one, 3 - desoxy - 17α - ethynyl - 18 - methylestr - 4 - en - 17β - ol and 17α - ethynyl - 17β - hydroxy - 18 - methylestr-5(10) - en - 3 - one are converted into 17α - (1′- propenyl) - 17β - hydroxy - 18 - methylestr - 5(10) - en-3 - one, 17α - (1' - propenyl) - 17β - hydroxy - 18 - ethylestr - 5(10) - en - 3 - one, 17α - vinyl - 17β - hydroxy-18 - n - propylestr - 5(10) - en - 3 - one, 17α - vinyl-17β - hydroxy - 18 - n - propylestr - 4 - en - 3 - one, 17α-(1' - propenyl) - 17β - hydroxy - 18 - ethylestr - 4 - en - 3-one, 3 - desoxy - 17α - vinyl - 18 - methylestr - 4 - en - 17β - ol and 17α - vinyl - 17β - hydroxy - 18 - methylestr-5(10)-en-3-one respectively.

PREPARATION E

Two milliliters of dihydropyran are added to a solution of 1 g. of 17β - hydroxy - 17α - isopropenyl-18-methylestr-4-en-3-one in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 17β-(tetrahydrophyran-2' - yloxy) - 17α - isopropenyl - 18 - methylestr - 4 - en-3-one which is recrystallized from pentane.

By repeating the above process using as the starting material the other 17β - hydroxy - 17α - alkenyl - 3-one compounds prepared hereinabove, the corresponding 17β - tetrahydropyran - 2 - yl derivatives, eg. - 17β-(tetrahydropyran - 2' - yloxy) - 17α - vinyl - 18 - methylestr - 5(10) -en - 3 - one, 17β - (tetrahydropyran - 2'-yloxy) - 17α - isopropenylestr - 4 - en - 3 - one, 17β - (tetrahydropyran - 2' - yloxy) - 17α - vinylestr - 4 - en - 3-one, 17β - (tetrahydropyran - 2' - yloxy) - 17α - vinyl-18 - methylandrost - 4 - en - 3 - one, 17β - (tetrahydropyran - 2' - yloxy) - 17α - isopropenyl - 18 - methylandrost - 4 - en - 3 - one, 17β - (tetrahydropyran - 2'-yloxy) - 17α - (1' - propenyl) - estr - 4 - en - 3 - one, etc. are obtained.

PREPARATION F

To a refluxing solution of 1 g. of 17α-vinyl - 17β - hydroxyestr-4-en-3-one in 10 ml. of diethylene glycol dimethyl ether is added over a two hour period in a dropwise fashion with stirring, a solution of 35 equivalents of sodium trichloroacetate in 40 ml. of diethylene glycol dimethyl ether. After refluxing for an additional hour, the mixture is filtered. The filtrate is evaporated to dryness and the residue is chromatographed on alumina, eluting with methylene chloride, to yield 17α-(2',2'-dichlorocyclopropyl) - 17β - hydroxyestr - 4 - en - 3 - one.

In a like fashion, 17α - vinyl - 17β - hydroxy - 18-methylestr - 4 - en - 3 - one, 17α - vinyl - 17β - hydroxyandrost - 4 - en - 3 - one, 17α - vinyl - 17β - hydroxy-18 - methylandrost - 4 - en - 3 - one, 17α - vinyl - 17β-hydroxyestr - 5(10) - en - 3 - one, 3 - desoxy - 17α-vinyl - 18 - methylestr - 4 - en - 17β - ol and 17α - vinyl-17β hydroxy - 18 - methylestr - 5(10) - en - 3 - one are subjected to the foregoing procedure to yield 17α-(2',2'-dichlorocyclopropyl) - 17β - hydroxy - 18 - methylestr-4 - en - 3 - one, 17α - (2',2' - dichlorocyclopropyl) - 17β-hydroxyandrost - 4 - en - 3 - one, 17α - (2',2'-dichloropropyl) - 17β - hydroxy - 18 - methylandrost - 4 - en - 3-one, 17α - (2'2' - dichlorocyclopropyl) - 17β - hydroxyestr - 5(10) - en - 3 - one, 3 - desoxy - 17α - (2',2' - dichlorocyclopropyl) - 18 - methylestr - 4 - en - 17β - ol and 17α - (2'2' - dichlorocyclopropyl) - 17β - hydroxy-18-methylestr-5(10)-en-3-one, respectively.

By the use of sodium tribromoacetate in place of sodium trichloroacetate in the foregoing procedure the products obtained are 17α - (2',2' - dibromocyclopropyl)-17β-hydroxyestr - 4 - en - 3 - one, 17α-(2',2'-dibromocyclopropyl) - 17β - hydroxy - 18 - methylestr-4-en-3-one, 17α-(2',2' - dibromocyclopropyl) - 17β - hydroxyandrost-4-en-3-one, 17α(2',2'-dibromocyclopropyl) - 17β - hydroxy-18-methylandrost-4-en-3-one, etc.

The corresponding 17β - (tetrahydropyran - 2 - yloxy)-17α-alkenyl compounds may be alternatively used in the foregoing procedure, the products thus obtained being similarly etherified, e.g. 17α-(2',2'-dichlorocyclopropyl)-17β - (tetrahydropyran - 2' - yloxy)-estr-4-en-3-one, 17α-(2',2'-dichlorocyclopropyl) - 17β - (tetrahydropyran-2'-yloxy)-18-methylestr-4-en - 3 - one, 17α-(2',2'-dibromocyclopropyl)-17β-(tetrahydropyran - 2' - yloxy)-estr-4-en-3-one, etc.

By the use of sodium chlorodifluoroacetate in lieu of sodium trichloroacetate in the foregoing procedure, the corresponding difluoro derivatives may be obtained, e.g. 17α - (2',2' - difluorocyclopropyl)-17β-hydroxyestr-4-en-3-one.

PREPARATION G

The process of Preparation F is repeated using 17α-isopropenyl - 17β - hydroxyestr - 4 - en - 3 - one, 17α-(1'-propenyl) - 17β - hydroxy - 18 - methylestr - 5(10)-en-3-one, 17α-(1' - propenyl) - 17β - hydroxyestr-5(10)-en-3-one, 17α-isopropenyl-17β-hydroxy - 18 - methylandrost-4-en-3-one, 17α-(1'-methyl-1'-propenyl) - 17β - hydroxy-18-methylestr-4-en-3-one, 17α-(1',3' - dimethyl-1'-propenyl)-17β-hydroxy - 18 - methylestr-5(10)-en-3-one, and 17α-isopropenyl-17β-hydroxy-18-methylestr - 4 - en-3-one to yield 17α-(2',2'-dichloro - 1' - methylcyclopropyl)-17β-hydroxyestr-4-en-3-one, 17α-(2',2'-dichloro - 3' - methylcyclopropyl)-17β-hydroxy - 18 - methylestr-5(10)-en-3-one, 17α-(2',2'-dichloro - 3' - methylcyclopropyl)-17β-hydroxyestr-5(10)-en-3-one, 17α - (2',2' - dichloro-1'-methylcyclopropyl) - 17β - hydroxy - 18 - methylandrost-4-en-3-one, 17α-(2',2' - dichloro - 1',3'-dimethylcyclopropyl)-17β-hydroxy-18-methylestr-4-en-3-one, 17α-(2',2'-dichloro-1',3',3'-trimethylcyclopropyl) - 17β - hydroxy-18-methylestr-5(10)-en-3-one, 17α-(2',2'-dichloro-1'-methylcyclopropyl)-17β-hydroxy - 18-methylestr-4-en-3-one, and the corresponding dibromo derivatives.

Similarly, the other 17α-alkenyl-17β-hydroxy derivatives and the corresponding 17β-tetrahydropyran-2-yl ethers may be subjected to the above procedure to obtain the corresponding free hydroxyl or ether derivative, e.g. 17α-(2',2' - dibromo - 1' - methylcyclopropyl)-17β-hydroxyestr-4-en-3-one, 17α-(2',2' - dichloro - 1' - methylcyclopropyl)-17β-(tetrahydropyran - 2' - yloxy)-estr-4-en-3-one, 17α-(2',2'-dibromo - 3' - methylcyclopropyl)-17β-hydroxy-18-methylestr - 5(10) - en-3-one, 17α(2',2'-dichloro-3'-methylcyclopropyl) - 17β - (tetrahydropyran-2'-yloxy-18-methylestr-5(10)-en-3-one, etc.

Example 1

To a suspension of 1 g. of 17α-(2',2'-dichlorocyclopropyl)-17β-(tetrahydropyran-2'-yloxy) - estr - 4 - en-3-one in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand for an additional 30 minutes. There is then added 0.8 ml. of pyridine, followed by water until solidification occurs. This solid is collected by filtration, washed with water and air dried to yield 3-ethoxy-17α-(2',2'-dichlorocyclopropyl)-17β-(tetrahydropyran-2'-yloxy)estra-3,5-diene.

A mixture of 1 g. of the above-prepared enol ether, 4 molar equivalents of sodium methylsulfinylcarbion, and 40 ml. of dimethylsulfoxide under nitrogen is allowed to stand at room temperature for 24 hours. Thereafter, the reaction mixture is poured into water and extracted with methylene chloride. The extracts are washed with water, dried and evaporated to yield 3-ethoxy-17α-propadienyl-17β-(tetrahydropyran-2'-yloxy)-estra-3,5-diene.

To a solution of 1 g. of the above-prepared 3-ethoxy-17α-propadienyl compound in 10 ml. of acetone are added a few drops of 36% hydrochloric acid. The mixture is heated a few minutes at steam bath temperature, diluted with water and filtered. The solid thus collected is dried and recrystallized from acetone: hexane to yield 17α-propadienyl-17β-hydroxyestr-4-en-3-one.

By repeating the foregoing procedure using as the starting material, 17α-(2',2'-dichlorocyclopropyl)-17β-(tetrahydropyran-2'-yloxy)-18-ethylestr-4-en-3-one, 17α-(2',2'-dichloro-1'-methylcyclopropyl)-17β-(tetrahydropyran-2'-yloxy)-estr-4-en-3-one, 17α-(2',2'-dichloro-3'-methylcyclopropyl)-17β-(tetrahydropyran-2'-yloxy)-estr-4-en-3-one, 17α-(2',2'-dichlorocyclopropyl)-17β-(tetrahydropyran-2'-yloxy)-18-methylestr-4-en-3-one, 17α-(2',2'-dichlorocyclopropyl)-17β-(tetrahydropyran-2'-yloxy)-18-methylandrost-4-en-3-one, or 17α-(2',2'-dichlorocyclopropyl)-17β-(tetrahydropyran-2'-yloxy)-androst-4-en-3-one, there is obtained 17α-propadienyl-17β-hydroxy-18-ethylestr-4-en-3-one, 17α-(1'-methylpropadienyl)17β-hydroxyestr-4-en-3-one, 17α-(3'-methylpropadienyl)-17β-hydroxyestr-4-en-3-one, 17α-propadienyl-17β-hydroxy-18-methylestr-4-en-3-one, 17α-propadienyl-17β-hydroxy-18-methylandrost-4-en-3-one, and 17α-propadienyl-17β-hydroxyandrost-4-en-3-one, respectively.

Example 2

A mixture of 1 g. of 17α-(2',2'-dichlorocyclopropyl)-17β-(tetrahydropyran-2'-yloxy)-estr-4-en-3-one, 25 ml. of dry benzene, 5 ml. of ethylene glycol and 50 mg. of p-toluenesulfonic acid monohydrate is refluxed for 4 hours using a water separator. The reaction mixture is then washed with aqueous sodium bicarbonate solution and water, dried and evaporated to dryness to yield 3-ethylenedioxy-17α-(2',2'-dichlorocyclopropyl)-17β-(tetrahydropyran-2'-yloxy)-estr-5-ene which may be recrystallized from acetone:hexane.

To a solution of 1 g. of the above-prepared compound in 40 ml. of anhydrous ether is added dropwise over a ten minute period with stirring 3 molar equivalents of butyl lithium in anhydrous ether while maintaining the reaction temperature at −35° C. The reaction mixture is allowed to stand for one hour at a temperature of −35° C. Thereafter, the reaction mixture is permitted to rise to room temperature, poured into water, and extracted with methylene chloride. The extracts are washed with water, dried and evaporated to dryness to yield 3-ethylenedioxy-17α-propadienyl-17β-(tetrahydropyran-2'-yloxy)-estr-5-ene.

A mixture of 0.5 g. of the above-prepared 17α-propadienyl compound in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 17α-propadienyl-17β-hydroxyestr-4-en-3-one which is recrystallized from acetone:hexane.

By repeating the process of this example and using as the starting material

17α-(2',2'-dichloro-1',3',3'-trimethylcyclopropyl)-17β-(tetrahydropyran-2'-yloxy)-estr-4-en-3-one,
17α-(2',2'-dichloro-1',3'-dimethylcyclopropyl)-17β-(tetrahydropyran-2'-yloxy)-18-methylandrost-4-en-3-one,
17α-(2',2'-dibromo-1'-methylcyclopropyl)-17β-(tetrahydropyran-2'-yloxy)-18-ethylandrost-4-en-3-one, or
17α(2',2'-dibromo-3'-methylcyclopropyl)-17β-(tetrahydropyran-2'-yloxy)-androst-4-en-3-one, there is obtained 17α-(1',3',3'-trimethylpropadienyl)-17β-hydroxyestr-4-en-3-one,
17α-(1',3'-dimethylpropadienyl)-17β-hydroxy-18-methylandrost-4-en-3-one,
17α-(1'-methylpropadienyl)-17β-hydroxy-18-ethylandrost-4-en-3-one, and
17α-(3'-methylpropadienyl)-17β-hydroxyandrost-4-en-3-one, respectively.

Example 3

To a refluxing solution of 1 g. of 17α-(2',2'-dichlorocyclopropyl)-estr-4-en-17β-ol-3-one, 1.3 g. of magnesium shavings, and 25 ml. of anhydrous ether are added over a one hour period 5.7 g. of ethyl bromide. When the addition is complete, the reaction mixture is refluxed an additional hour and then cautiously hydrolyzed by a dropwise addition of water, followed by 10 percent hydrochloric acid. The ether layer is separated, dried and evaporated to give 17α-propadienylestr-4-en-17β-ol-3-one.

By likewise subjecting the other 17α-(2',2'-dichlorocyclopropyl) compounds to the procedure of this example, the corresponding 17α-propadienyl derivatives are obtained. For example, by subjecting 3-desoxy-17α-(2',2'-dichlorocyclopropyl)-18-methylestr-4-en-17β-ol, 3-desoxy-17α-(2',2'-dichlorocyclopropyl)-18-ethylestr-4-en-17β-ol, 3-desoxy-17α-(2',2'-dichlorocyclopropyl)-estr-4-en-17β-ol, 17α-(2',2'-dichlorocyclopropyl)-17β-hydroxy-18-methyl-estr-5(10)-en-3-one or 17α-(2',2'-dichloro-1',3'3'-trimethylcyclopropyl)-17-hydroxy-18-methylestr-5(10)-en-3-one to the foregoing procedure, there is obtained 3-desoxy-17α-propadienyl-18-methyl-estr-4-en-17β-ol, 3-desoxy-17α-propadienyl-18-ethylestr-4-en-17β-ol, 3-desoxy-17α-propadienylestr-4-en-17β-ol, 17α-propadienyl-17β-hydroxy-18-methylestr-5(10)-en-3-one and 17α-(1',3',3'-trimethyl-propadienyl)-17-hydroxy-18-methylestr-5(10)-3-one, respectively.

Example 4

A mixture of 1 g. of 17α-(2',2'-dibromocyclopropyl)-17β-(tetrahydropyran-2'-yloxy)-18-methylestr-4-en-3β-ol, 4 molar equivalents of potassium t-butoxide, and 35 ml. of dimethyl sulfoxide under nitrogen is allowed to stand at room temperature for 24 hours. Then, the reaction mixture is poured into water and extracted with methylene chloride. The organic extracts are washed with water, dried and evaporated to yield 17α-propadienyl-17β-(tetrahydropyran-2'-yloxy)-18-methylestr-4-en-3β-ol.

The 3β-hydroxy starting material used in the process of this example may be obtained as follows.

One gram of lithium tri-t-butoxyaluminum hydride is added to an ice-cooled solution of 1 g. of 17α-(2',2'-dibromocyclopropyl)-17β-(tetrahydropyran-2'-yloxy)-18-methylestr-4-en-3-one in 120 ml. of tetrahydrofuran and the mixture is allowed to stand for 16 hours at room temperature. The excess reagent is decomposed by addition of water and the solution is then concentrated to small volume in vacuo and diluted with water. The product is extracted with ethyl acetate and these extracts are washed with water, dried and evaporated to yield 17α-(2',2'-dibromocyclopropyl)-17β-(tetrahydropyran-2'-yloxy)-18-methylestr-4-en-3β-ol which may be further purified by recrystallization from acetone:hexane.

Similarly, the foregoing procedure may be utilized to reduce other 17α-dihalocyclopropyl-3-one compounds described hereinabove to the corresponding 3β-hydroxy derivative, e.g. 17α(2'2'-dichlorocyclopropyl)-estr-4-ene-3β,17β-diol, 17α-(2',2'-dichlorocyclopropyl)-17β-(tetrahydropyran-2'-yloxy)-estr-4-en-3β-ol, 17α-(2',2'-dibromocyclopropyl)-18-methylandrost-4-ene-3β,17β-diol, 17α-(2',2'-dibromocyclopropyl)-17β-(tetrahydropyran-2'-yloxy)-estr-4-en-3β-ol, etc.

Example 5

A mixture of 1 g. of 17α-(2',2'-dibromocyclopropyl)-17β-hydroxyestr-5(10)-en-3-one, 1.2 g. of magnesium turnings and 30 ml. of anhydrous diethyl ether is refluxed for three hours. The reaction mixture is then filtered and the filtrate washed several times with water. The ether layer is separated, dried and evaporated to yield 17α-propadienyl-17β-hydroxyestr-5(10)-en-3-one.

By repeating the foregoing procedure and using other 17α-dibromocyclopropyl compounds, the corresponding 17α-propadienyl derivatives may be obtained, e.g. 17α-propadienyl-17β-(tetrahydropyran-2'-yloxy)-18-mehtylandrost-4-en-3-one, 17α-propadienyl-17β-(tetrahydropyran-2'-yloxy)-18-methylandrost-4-en-3β-ol, 17α-propadienyl - 17β-(tetrahydropyran-2'-yloxy)-estr-5(10)-3-one, 3 - desoxy - 17α - propadienyl-17β-(tetrahydropyran-2'-yloxy)-18-methylestr-4-ene, 3-desoxy-17α-propadienyl-18-estr-4-en-17β-ol, etc.

Example 6

A mixture of 1 g. of 17α-(2',2'-dibromocyclopropyl)-17β - (tetrahydropyran-2'-yloxy)-estr-4-en-3β-ol, 4 molar equivalents of sodium methylsulfinylcarbanion, and 40 ml. of dry dimethyl sulfoxide under nitrogen is allowed to stand at room temperature for 24 hours. The reaction mixture is then poured into water and extracted with methylene chloride. The organic extract is washed several times with water, dried and evaporated to yield 17α-propadienyl - 17β-(tetrahydropyran-2'-yloxy)-estr-4-en-3β-ol.

In a similar fashion, the process of this example may be used to convert other 17α-dibromocyclopropyl compounds described hereinabove to the corresponding 17α-propadienyl derivative.

Example 7

A solution of 5 g. of 17α-propadienyl-17β-hydroxy-18-methylandrost-4-en-3-one in 100 ml. of glacial acetic acid containing 5 ml. of ethane dithiol and 4 ml. of a saturated solution of hydrogen chloride in acetic acid, is allowed to stand at room temperature for 4 hours. Water is added and the resulting mixture then extracted with ethyl acetate. The extracts are washed with a 5% aqueous sodium bicarbonate solution and water, dried over sodium sulfate and evaporated to dryness. The residue is recrystallized from ether:hexane and 4 g. of this material in 3 liters of ethanol (previously distilled over Raney nickel) is heated at reflux with 50 g. of degassed Raney nickel for 6 hours. The metal is removed by filtration and washed with hot ethanol and the filtrate evaporated to dryness. The residue is dissolved in chloroform and this chloroform solution is washed with dilute hydrochloric acid, sodium carbonate solution and water, dried and evaporated to dryness to yield 3-desoxy-17α-propadienyl-18-methylandrost-4-en-17β-ol.

By subjecting the other 3-keto compounds of the present invention to the process of this example, as for example, 17α-propadienyl-17β-hydroxy - 18 - ethylandrost-4-en-3-one, 17α-propadienyl - 17β - hydroxyandrost-4-en-3-one, and 17α-propadienyl-17β-hydroxy - 18 - methylestr-5(10)-en-3-one, 17α-propadienyl-17β-hydroxyestr-5(10)-en-3-one, 17α-(1',3'-dimethylpropadienyl) - 17β-hydroxy-estr-4-en-3-one, 17α - propadienyl-17β-hydroxy-18-n-propylestr-4-en-3-one, etc., there is obtained the corresponding 3-desoxy derivative.

Example 8

Two milliliters of dihydropyran are added to a solution of 1 g. of 17α-propadienyl-17β-hydroxyestr-4-en-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 17α-propadienyl-17β-(tetrahydropyran-2'-yloxy)estr-4-en-3-one which is recrystallized from pentane.

By repeating the process of this example using the other 17β-hydroxy-3-one and 17β-hydroxy-3-desoxy compounds of the present invention, the corresponding 17β-tetrahydropyranyl ethers, e.g.
17α-(1'-methylpropadienyl)-17β-(tetrahydropyran-2'-yloxy)-estr-4-en-3-one,
17α-(3'-methylpropadienyl)-17β-(tetrahydropyran-2'-yloxy)-estr-4-en-3-one,
17α-propadienyl-17β-(tetrahydropyran-2'-yloxy)-18-methylester-3-one,
17α-propadienyl-17β-(tetrahydropyran-2'-yloxy)-18-methylandrost-4-en-3-one,
3-desoxy-17α-propadienyl-17β-(tetrahydropyran-2'-yloxy)-18-methylestr-4-ene,
3-desoxy-17α-propadienyl-17β-(tetrahydropyran-2'-yloxy)-18-ethyl-estr-4-ene,
3-desoxy-17α-propadienyl-17β-(tetrahydropyran-2'-yloxy)-estr-4-ene,
17α-propadienyl-17β-(tetrahydropyran-2'-yloxy)-estr-5(10)-en-3-one,
17α-propadienyl-17β-(tetrahydropyran-2'-yloxy)-18-methylestr-5(10)-en-3-one, etc. are obtained.

Example 9

A mixture of 1 g. of 17α-propadienyl-17β-hydroxy-estr-4-en-3-one, 1 g. of p-toluenesulfonic acid monohydrate, 50 ml. of acetic acid and 25 ml. of acetic anhydride is allowed to stand at room temperature for 24 hours and is then poured into water and stirred. This mixture is then extracted with methylene chloride and these extracts are dried and evaporated to yield 17α-propadienyl-17β-acetoxyestr-4-en-3-one.

Likewise, through the use of other 17β-hydroxy compounds of the present invention, the corresponding 17β-acetoxy derivatives, e.g. 17α-propadienyl-17β-acetoxy-18-methylestr-4-en-3-one, 17α - propadienyl-17β-acetoxyestr-5(10)-en-3-one, 17α - propadienyl-17β-acetoxyandrost-4-en-3-one, 3-desoxy-17α-propadienyl-17β-acetoxy-18-methylestr-4-ene, 17α-propadienyl - 17β - acetoxy-18-methylandrost-4-en-3-one, 17α-propadienyl - 17β - acetoxy-18-methylestr-5(10)-en-3-one, etc. are obtained.

Example 10

One gram of lithium tri-t-butoxyaluminum hydride is added to an ice-cooled solution of 1 g. of 17α-propadienyl-17β-acetoxyestr-4-en-3-one in 120 ml. of dry tetrahydrofuran and the mixture is then allowed to stand for 16 hours at room temperature. The excess reagent is decomposed by addition of water and the solution is then concentrated to small volume in vacuo and diluted with water. The product is extracted with ethyl acetate and these extracts are washed with water, dried and evaporated to yield 17α-propadienyl-17β-acetoxyestr-4-en-3β-ol which may be further purifield by recrystallization from acetone:hexane.

Similarly, the process of this example may be used to convert other 17α-diene-3-keto compounds of the present invention into the corresponding 3β-hydroxy derivative, e.g. 17α-propadienyl-17β-acetoxy-18-methylestr-4-en-3β-ol, 17α-propadienylestr-4-ene-3β, 17β-diol, 17α-propadienyl-18-methylandrost - 4 - ene-3β,17β-diol, 17α-propadienyl-17β-acetoxy-18-methylandrost-4-en-3β-ol, etc.

Example 11

A solution of 1 g. of sodium borohydride in 3 ml. of water is added to a solution of 1 g. of 17α-propadienyl-17β-acetoxyestr-5(10)-en-3-one in 120 ml. of methanol at 0° C. and the mixture then allowed to stand for 15 minutes. The excess reagent is decomposed by the addition of acetic acid and the solution is then concentrated to small volume in vacuo and diluted with water. The product is extracted with ethyl acetate and these extracts are washed with water, dried and evaporated to yield 17α-propadienyl-17β-acetoxyestr-5(10)-en-3β-ol.

By repeating the foregoing procedure, 17α-propadienyl-17β - acetoxy-18-methylestr-5(10)-en-3-one, 17α-propadienyl-17β-hydroxyestr-5(10)-en-3-one, etc. may be converted into the corresponding 3β-hydroxy derivative.

Example 12

Two milliliters of dihydropyran are added to a solution of 1 g. of 17α-propadienyl-17β-acetoxyester-4-en-3β-ol in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried, and evaporated. The residue is chromatographed on neutral alumina, eluting with hexane, to yield 3β-(tetrahydropyran-2'-yloxy) - 17α-propadienyl-17β-acetoxyester-4-ene which is recrystallized from pentane.

By repeating the foregoing procedure use 17α-propadienyl-17β-acetoxy-18-methylester-4-en-3β-ol, 17α-propadienyl-17β-acetoxy-18-methylandrost-4-en-3β-ol, 17α-propadienyl-17β-acetoxyestr-5(10)-en-3β-ol, and 17α-propadienyl-17β-acetoxy-18-methylestr - 5(10)-en-3β-ol, 17α-(1'-methylpropadienyl)-17β - acetoxyestr-4-en-3β-ol, the corresponding 3-(tetrahydropyran-2'-yl)ether derivatives are obtained.

Similarly, using dihydrofuran in lieu of dihydropyran in the process of this example, there are obtained the corresponding 3-tetrahydrofuranyl ethers, e.g. 3β-(tetrahydrofuran-2'-yloxy) - 17α-propadienyl-17β-acetoxyestr-4-ene.

Example 13

A suspension of 1 g. of 3β-(tetrahydropyran-2'-yloxy)-17α-propadienyl - 17β-acetoxyestr-4-ene in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield 3β-(tetrahydropyran-2'-yloxy)-17α-propadienylestr-4-en-17β-ol which is recrystallized from acetone:hexane.

Similarly, using the above procedure, the other 17β-acetoxy compounds of the present invention may be converted into the corresponding 17β-hydroxy derivatives, e.g. 3β-(tetrahydropyran-2'-yloxy)17α - propadienyl-18-methylestr-4-en-17β-ol.

Example 14

A mixture of 1 g. of 17β-hydroxy-17α-propadienyl-estr-4-en-3-one, 1 g. of p-toluenesulfonic acid monohydrate, 50 ml. of dichloroacetic acid and 25 ml. of dichloroacetic acid anhydride is allowed to stand at room temperature for 24 hours, and then poured into water and stirred. This mixture is then extracted with methylene chloride and the organic extracts are dried and evaporated to yield 17β-dichloroacetoxy-17α-propadienylestr-4-en-3-one.

Example 15

A mixture of 1 g. of 17α-propadienylestr-4-ene-3β,17β-diol, 4 ml. of pyridine and 2 mol. of acetic anhydride is allowed to stand at room temperature for 15 hours. The mixture is then poured into ice water and the solid which forms is collected by filtration, washed with water and dried to yield 3β-acetoxy-17α-propadienylestr-4-en-17β-ol which may be further purified through recrystallization from acetone:hexane.

In a similar manner, the other 3β-hydroxy compounds of the present invention may be converted to the corresponding 3β-acetoxy derivatives, e.g. 3β-acetoxy-17α-propadienylestr-5(10)-en-17β-ol, 3β-acetoxy-17α-propadienylandrost-4-en-17β-ol, etc. Alternatively, through the use of other anhydrides in the foregoing procedure, the corresponding 3β-acylates are obtained, e.g. 3β-propionate, and the like.

By repeating the procedure of Example 12 hereinabove, the foregoing 3β-acyloxy - 17β-hydroxy compound may be converted into the corresponding 3β-acyloxy-17β-tetrahydropropanyl ether derivative, e.g. 3β-acetoxy-17α - propadienyl-17β - (tetrahydropyran-2'-yloxy)-estr-4-ene and the corresponding 3β-acyloxy-17β-tetrahydrofuranyl ether derivative, e.g. 3β-acetoxy-17α-propadienyl-17β-(tetrahydrofuran-2'-yloxy)-estr-4-ene.

By repeating the procedure of Example 13 hereinabove, the foregoing 3β-acetoxy compounds may be converted into the corresponding 3β-hydroxy derivatives, e.g. 17α-propadienyl-17β - (tetrahydrofuranyl-2'-yloxy)-estr-4-en-3β-ol, etc.

Example 16

A mixture of 1 g. of 17α-propadienylestr-4-ene-3β,17β-diol, 1 g. of p-toluene sulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 3β,17β-diacetoxy-17α-propadienylestr-4-ene which is recrystallized from acetone:ether.

By repeating the foregoing procedure, the other 3β,17β-diol compounds of the present invention may be converted into the corresponding 3β,17β-diacetate derivatives, e.g. 3β,17β-diacetoxy-17α - propadienyl-18-methylestr-4-ene, 3β,17β-diacetoxy-17α-propadienyl-18-methylandrost-4-ene, 3β,17β-diacetoxy-17α - (3'-methylpropadienyl)-estr-4-ene, etc.

Example 17

Five milliliters of dihydropyran are added to a solution of 1 g. of 17α-propadienyl-18-methylandrost-4-ene-3β,17β-diol in 20 ml. of benzene. About 1 ml. is removed by distillation to remove moisture and 0.6 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3β,17β-bis(tetrahydropyran-2'-yloxy)-17α-propadienyl-18-methylandrost-4-ene.

Using the above procedure, the other 3β,17β-diol compounds of the present invention may be converted into the corresponding 3β,17β-bis tetrahydropyranyl ethers.

Similarly, using dihydrofuran in place of dihydropyran in the foregoing procedure, there are obtained the corresponding 3β,17β-bis tetrahydrofuranyl ethers, e.g. 3β,17β-bis(tetrahydrofuran-2' - yloxy)-17α - propadienyl-18-methylandrost-4-ene.

What is claimed is:

1. A compound of the formula:

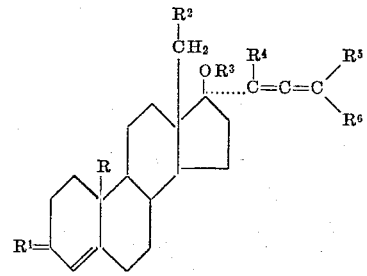

wherein $R^1$ is selected from the group consisting of oxo and the group

wherein $R^7$ is selected from the group consisting of hydrogen, hydroxy, tetrahydropyran-2-yloxy, tetrahydrofuran-2-yloxy, and a carboxylic acyloxy group containing less than 12 carbon atoms;

R is selected from the group consisting of hydrogen and methyl;

$R^2$ is selected from the group consisting of hydrogen and a lower alkyl containing from 1 to 3 carbon atoms;

$R^3$ is selected from the group consisting of hydrogen, tetrahydropyran-2-yl, tetrahydrofuran-2-yl, and a carboxylic acyl group containing less than 12 carbon atoms; and each of $R^4$, $R^5$ and $R^6$ is selected from the group consisting of hydrogen and methyl.

2. A compound according to claim 1 wherein $R^4$, $R^5$ and $R^6$ are each hydrogen.

3. A compound according to claim 1 wherein $R^1$ is oxo and $R^4$, $R^5$ and $R^6$ are each hydrogen.

4. A compound to claim 1 wherein $R^1$ is oxo and R, $R^4$, $R^5$ and $R^6$ are each hydrogen.

5. A compound according to claim 1 wherein $R^1$ is oxo, $R^3$ is tetrahydropyran-2-yl, and R, $R^2$, $R^4$, $R^5$ and $R^6$ are each hydrogen.

6. A compound according to claim 1 wherein $R^1$ is oxo, $R^2$ is methyl, $R^3$ is tetrahydropyran-2-yl, and R, $R^4$, $R^5$ and $R^6$ are each hydrogen.

7. A compound according to claim 1 wherein $R^1$ is oxo, $R^3$ is acetyl, and R, $R^2$, $R^4$, $R^5$ and $R^6$ are each hydrogen.

8. A compound according to claim 1 wherein $R^1$ is oxo, $R^2$ is methyl, $R^3$ is acetyl, and R, $R^4$, $R^5$ and $R^6$ are each hydrogen.

9. A compound according to claim 1 wherein $R^1$ is oxo, $R^3$ is dichloroacetyl, and R, $R^2$, $R^4$, $R^5$ and $R^6$ are each hydrogen.

10. A compound according to claim 1 wherein $R^1$ is the group

wherein $R^7$ is acetoxy, $R^3$ is acetyl, and R, $R^2$, $R^4$, $R^5$ and $R^6$ are each hydrogen.

11. A compound according to claim 1 wherein R, $R^3$, $R^4$, $R^5$ and $R^6$ are each hydrogen, and $R^1$ is the group

wherein $R^7$ is hydrogen.

12. A compound according to claim 11 wherein $R^2$ is hydrogen.

13. A compound according to claim 1 wherein $R^1$ is oxo and R, $R^3$, $R^4$, $R^5$ and $R^6$ are each hydrogen.

14. A compound according to claim 13 wherein $R^2$ is hydrogen.

15. A compound according to claim 13 wherein $R^2$ is methyl.

16. A compound according to claim 1 wherein R, $R^2$, $R^4$, $R^5$ and $R^6$ are each hydrogen and $R^1$ is the group

wherein $R^7$ is tetrahydropyran-2-yloxy.

17. A compound according to claim 16 wherein $R^3$ is hydrogen.

18. A compound according to claim 1 wherein R, $R^2$, $R^4$, $R^5$ and $R^6$ are each hydrogen and $R^1$ is the group

wherein $R^7$ is hydroxy.

19. A compound according to claim 18 wherein $R^3$ is hydrogen.

20. A compound of the formula:

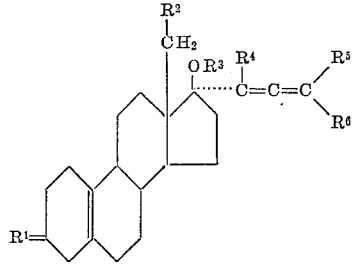

wherein $R^1$ is selected from the group consisting of oxo and the group

wherein $R^7$ is selected from the group consisting of hydrogen, hydroxy, tetrahydropyran-2-yloxy, tetrahydrofuran-2-yloxy, and a carboxylic acyl group containing less than 12 carbon atoms;

$R^2$ is selected from the group consisting of hydrogen and a lower alkyl containing from 1 to 3 carbon atoms;

$R^3$ is selected from the group consisting of hydrogen, tetrahydropyran-2-yl, tetrahydrofuran-2-yl, and a carboxylic acyl group containing less than 12 carbon atoms; and each of $R^4$, $R^5$ and $R^6$ is selected from the group consisting of hydrogen and methyl.

21. A compound according to claim 20 wherein $R^4$, $R^5$ and $R^6$ are each hydrogen.

22. A compound according to claim 20 wherein $R^1$ is oxo and $R^4$, $R^5$ and $R^6$ are each hydrogen.

23. A compound according to claim 22 wherein $R^2$ is hydrogen.

24. A compound according to claim 22 wherein $R^2$ is methyl.

25. A compound according to claim 20 wherein $R^1$ is oxo and $R^3$, $R^4$, $R^5$ and $R^6$ are each hydrogen.

26. A compound according to claim 20 wherein $R^1$ is oxo, $R^3$ is acetyl and $R^4$, $R^5$ and $R^6$ are each hydrogen.

27. A compound according to claim 20 wherein $R^1$ is oxo, $R^3$ is tetrahydropyran-2-yl, and $R^4$, $R^5$ and $R^6$ are each hydrogen.

References Cited

UNITED STATES PATENTS 2,838,530  6/1958  Colton _____ 260—397.4

LEWIS GOTTS, *Primary Examiner.*

T. M. MESHBESHER, *Assistant Examiner.*

Notice of Adverse Decision in Interference

In Interference No. 97,278 involving Patent No. 3,392.166, J. A. Edwards and L. H. Knox, deceased, by A. A. Knox. ANDROST-4-ENES AND ESTR-4-ENES HAVING A 17α-DIETHYLENICALLY UNSATURATED SIDE CHAIN, final judgment adverse to the patentees was rendered May 10, 1974, as to claims 1, and 20.

[*Official Gazette of September 24, 1974.*]

Disclaimer 3,392,166.—*John A. Edwards*, Los Altos, Calif., and *Lawrence H. Knox*, deceased, late of Mexico City, Mexico, by *Anne A. Knox*, Mexico City, Mexico. ANDROST-4-ENES AND ESTR-4-ENES HAVING A 17α-DIETHYLENICALLY UNSATURATED SIDE CHAIN. Patent dated July 9, 1968. Disclaimer filed Apr. 9, 1976, by the assignee, *Syntex Corporation*.

Hereby enters this disclaimer to claims 10, 12, 14, 15 and 19 of said patent.
[*Official Gazette June 1, 1976.*]